Sept. 21, 1954     A. J. HORNFECK     2,689,932
BALANCEABLE NETWORK ELECTRIC MEASURING SYSTEM
Original Filed Aug. 2, 1947     2 Sheets-Sheet 1
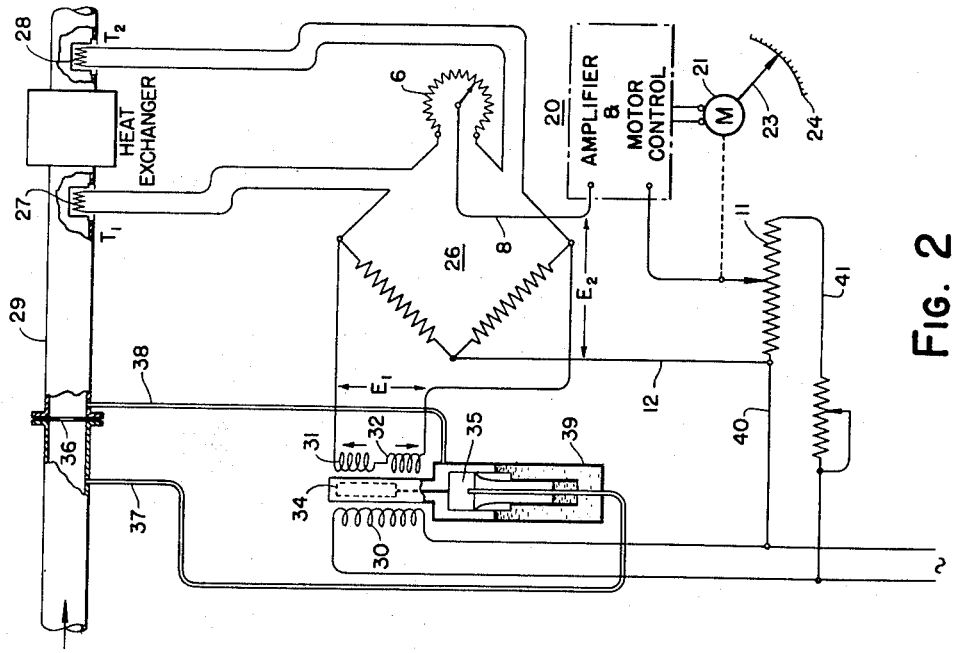
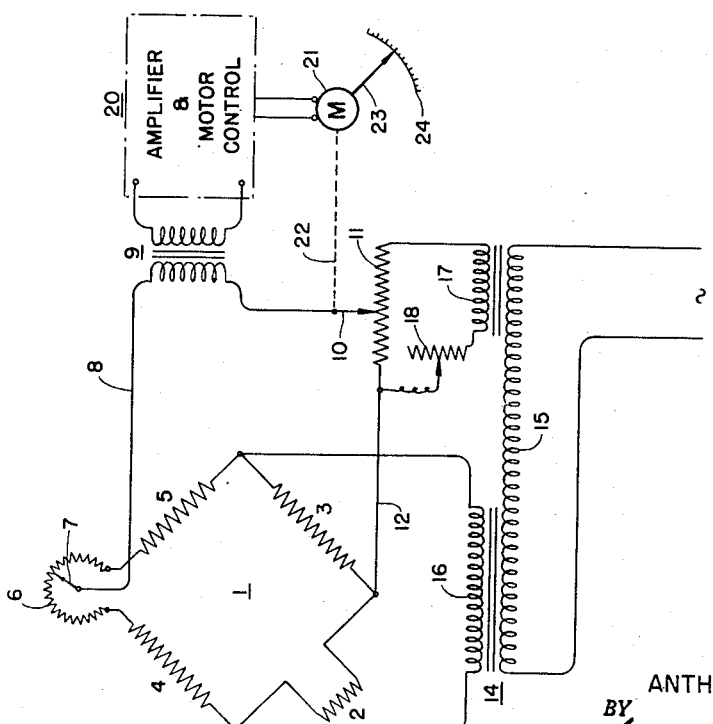
INVENTOR.
ANTHONY J. HORNFECK
BY
*Raymond D. Junkins*
ATTORNEY Sept. 21, 1954    A. J. HORNFECK    2,689,932
BALANCEABLE NETWORK ELECTRIC MEASURING SYSTEM
Original Filed Aug. 2, 1947    2 Sheets-Sheet 2
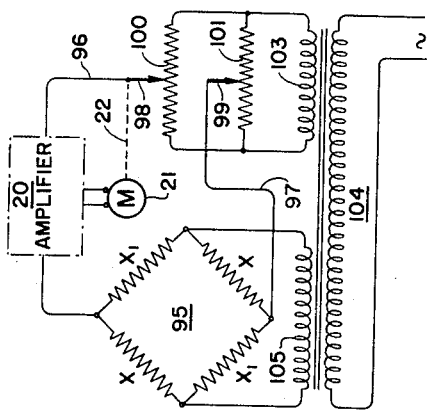
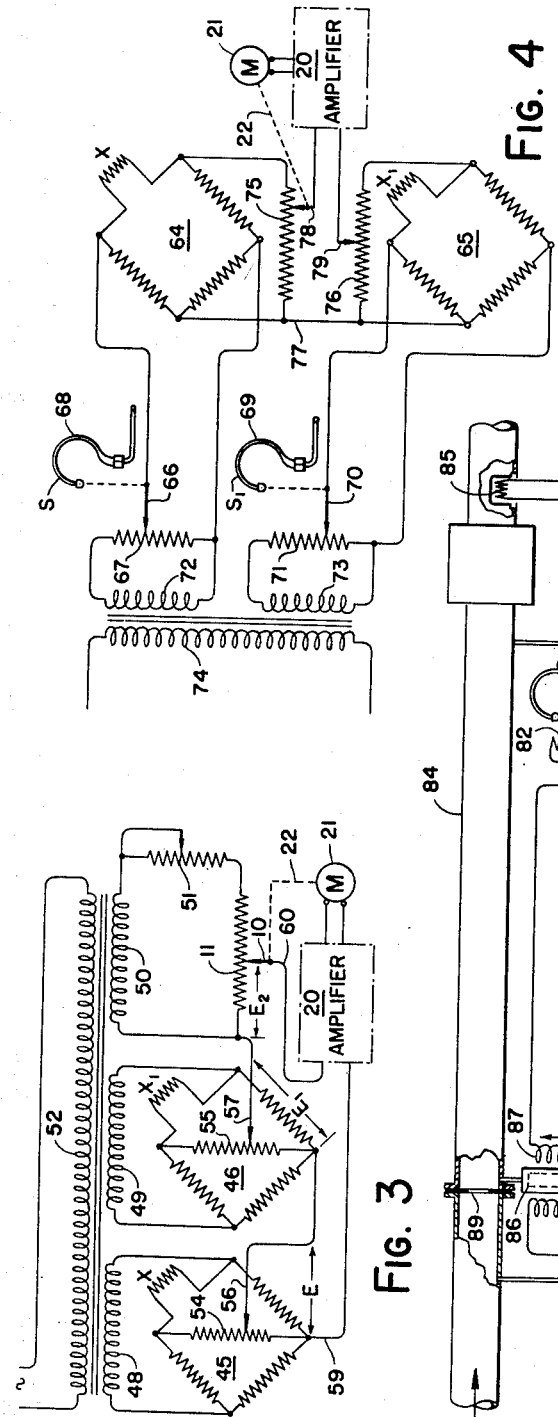
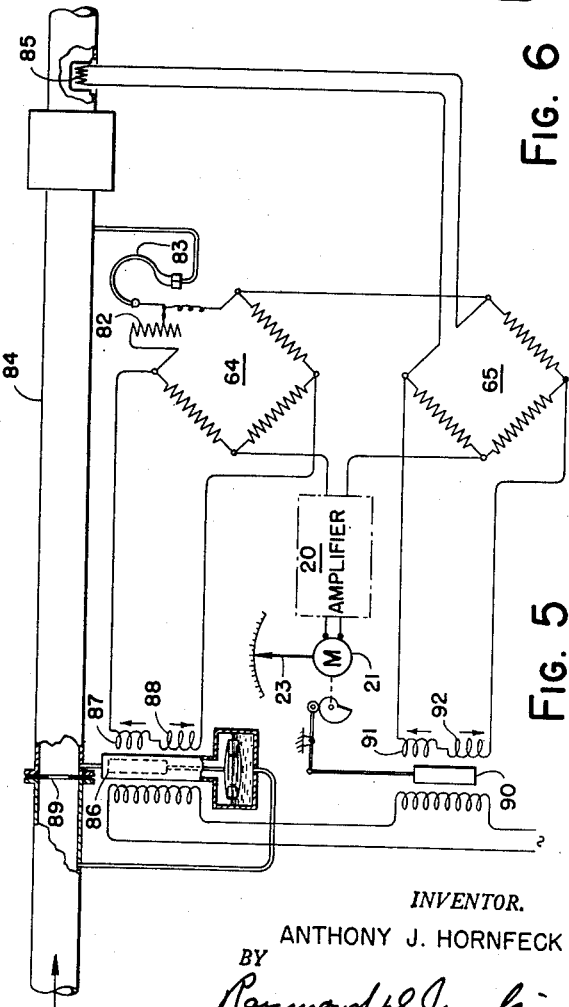
INVENTOR.
ANTHONY J. HORNFECK
BY
Raymond W. Junkins
ATTORNEY Patented Sept. 21, 1954

2,689,932

UNITED STATES PATENT OFFICE 2,689,932

BALANCEABLE NETWORK ELECTRIC MEASURING SYSTEM

Anthony J. Hornfeck, South Euclid, Ohio, assignor to Bailey Meter Company, a corporation of Delaware Original application August 2, 1947, Serial No. 765,760, now Patent No. 2,612,628, dated September 30, 1952. Divided and this application April 3, 1952, Serial No. 280,307

7 Claims. (Cl. 318—28)

My invention relates to electric measuring systems which are responsive to one or more variable conditions and operate to measure the variable or some function of the variables.

The measurement of a variable condition is frequently accomplished by effecting an unbalance of a balanceable network in accordance with variations in the condition and causing means to operate as a result of such unbalance and return the network to a balanced condition. It is necessary with such a system to provide leads from the balanced network having resistances so designed as to subject the operating means only to voltages proportional to the actual unbalance of the network. When the changes of the variable condition are such as to effect only a very slight unbalance of the network, it is difficult to produce a change in a resistance of the network to return the latter to a balanced condition. Instead of rebalancing the network, it has been found that better results may be obtained by subjecting the output voltage of the network to an opposing voltage which is regulated by means operating in response to the difference between the two voltages. A close adjustment of the opposing voltage may be obtained because substantial operation of the operating means can be made to produce only slight changes in voltage. The resistances of the leads from the network with such an arrangement do not affect the operation of the system. This arrangement does require, however, that the voltage applied to the network for energizing the latter, and voltage applied to the system for producing the opposing voltage, be maintained directly proportional to each other. If the system is to operate on direct current, separate sources of power must be provided for the network and the opposing voltage, and regulators are then required to maintain the desired voltage relationship. By operating the system on alternating current, the input voltage for the network and the opposing voltage may be obtained from the same source if a transformer is used in transmitting power to at least one portion of the system so that the separately energized parts are insulated from each other. Any changes in the voltage at the source will then be reflected proportionately to both ends of the network.

If desired, the input voltage to the network may be varied in accordance with one variable while the network balance is varied in accordance with one or more variables. Regulation of the voltage opposing the output of the network is then an indication of some function of the variables. By varying the output of one network in response to changes in one or more variables and opposing this output by a voltage which is caused to vary in response to other variables, as well as by means operating on a difference between the voltages, indications may be obtained of other functions of the variables.

An object of my invention is to provide improved systems for measuring variables. Another object is to provide an improved measuring system in which the voltage output of a network responsive to one or more variables is opposed by a voltage regulated by means operating in response to differences between the voltages. Yet another object is to provide an improved measuring system having means for producing opposing voltages varying in response to variables and brought into balance with each other by means operating in response to differences between the voltages. Other objects will appear in the course of the following description.

In the accompanying drawings there are shown for purposes of illustration several forms which my invention may assume in practice.

In these drawings:

Fig. 1 is a schematic diagram of a system including a bridge circuit which is unbalanced in response to a variable and has its output voltage opposed by another voltage regulated by means operating in response to the differences between the voltages.

Fig. 2 is similar to Fig. 1 but has means for varying the input to the bridge in response to a variable while the bridge unbalance is determined by two variables.

Fig. 3 shows two bridge circuits unbalanced in response to variables and operating together to determine a voltage which is to be measured.

Figs. 4 and 5 show systems in which voltages produced as a result of the unbalance of separate bridge circuits are opposed to each other in determining the operation of means for regulating one of the voltages.

Fig. 6 shows a system in which the output voltage of a bridge unbalanced by a variable condition is opposed by the output voltage of another bridge which is adjustable to balance the system.

Referring to the drawings it will be noted that there is shown in Fig. 1 a system which is adapted to measure changes in a single variable condition. This system includes a Wheatstone bridge 1 having an element 2 forming one of its legs and varying in resistance in response to changes in the condition, a fixed resistance 3 forming a second leg, and fixed resistances 4 and 5 combined with portions of the potentiometer 6 to form the third and fourth legs. A contact 7 is adjustable manually to divide the potentiometer resistance between the third and fourth legs so that the point from which changes are to be measured may be varied at will. The contact 7 is connected by a conductor 8 to one end of the primary winding of a transformer 9, and the other end of the primary winding is connected to a contact 10 of a potentiometer 11. One end of the potentiometer 11 is connected by a conductor 12 to a point on the bridge between the resistances 2 and 3. A transformer 14 has a primary winding 15 connected to a source of alternating current, and a pair of secondary windings 16, 17, the winding 16 being connected to diagonally opposite points of the bridge for energizing the latter, and the winding 17 being connected with an adjustable resistance 18 across the potentiometer 11. The secondary winding of the transformer 9 is connected to an amplifier and motor control device 20 which effects operation of a motor 21 in one direction or the other depending upon the phase of the voltage energizing the transformer.

The connection of the secondary winding 17 to the potentiometer 11 is such that the voltage drop in the potentiometer opposes the voltage output of the bridge in determining the flow of current through the primary winding of the transformer 9. When the bridge output exceeds the voltage drop in the portion of the potentiometer between the contact 10 and the conductor 12, the current flow through the primary winding of the transformer 9 is such as to effect operation of the motor 21 in a direction to position the contact 10 through a connection 22 so as to increase the portion of the potentiometer connected in the output circuit of the bridge. If the condition changes so that the bridge output drops below the opposing voltage from the potentiometer, the motor operates in a direction to reduce the portion of the potentiometer connected in the bridge output circuit. An indicator 23 is operatively connected to the motor for indicating on a scale 24 the value of the condition.

In Fig. 2 there is shown a bridge 26 similar to that of Fig. 1 but having resistances 27, 28 forming different bridge legs and varying in resistance in response to changes in temperature at different points in a conduit 29 conducting fluid, such as steam. For energizing the bridge there is provided a transformer having a primary winding 30 connected to a source of alternating current, and a pair of bucking secondary windings 31, 32 connected to diagonally opposite points of the bridge. A core member 34 is supported by a float 35 for movement between the primary and secondary windings, and pressures at opposite sides of an orifice 36 in the conduit 29 are supplied through conduits 37, 38 to opposite surfaces of the float for determining the position of the latter in a sealing liquid within a container 39. The float shown herein is so shaped that the position of the core member 34 is changed in response to changes in the rate of fluid flow. The output conductors 8 and 12 of the bridge are shown in this case connected with the variable portion of the potentiometer 11 directly to the input terminals of the amplifier and motor control device. The potentiometer 11 is energized by its direct connection to the source of alternating current through conductors 40 and 41.

When the core member 34 is centered with respect to the secondary windings 31, 32, the voltage input to the bridge is zero, and this position of the core member is obtained when there is no flow of fluid in the conduit 29. As the core member is moved from its centered position, the voltage induced in one of the secondary windings is increased while it is decreased in the other winding, and the changes in the induced voltages are in direct proportion to the distance that the core member moves. The voltage $E_1$ across the secondary terminals and applied to the input terminals of the bridge is then directly proportional to the rate of fluid flow. Representing the flow of the fluid by the letter Q, the following equation holds:

$$E_1 = K_1 Q$$

where $K_1$ = a constant.

The unbalance of the bridge is equal to the difference between the resistances 27, 28, and the values of these resistances are directly proportional to the temperatures at the points where the resistances are located. The voltage output of the bridge is proportional to the voltage input times the bridge unbalance. If the temperatures at the resistances 27, 28, are represented by $T_1$ and $T_2$, then the voltage output $E_2$ of the bridge is indicated by the following equations:

$$E_2 = K_1 Q \times K_2 (T_1 - T_2)$$
$$E_2 = K_0 (\text{flow} \times \Delta T)$$

where $K_0$ = a constant.

In Fig. 3 there is shown a system in which a voltage determined by the unbalance of two bridge circuits is opposed by the voltage drop across a portion of the potentiometer 11. In this case, bridge circuits 45, 46 are each provided with fixed resistances in three of its legs and a resistance forming the fourth leg varying in value in response to changes in some condition. The values of the variable resistances in bridges 45, 46 are each representative of a condition and have been indicated by X and $X_1$ respectively. The secondary windings 48, 49 of a transformer are connected to diagonally opposite points of the bridge circuits for energizing the latter, and a third secondary winding 50 is connected with an adjustable resistance 51 across the potentiometer 11. A primary winding 52 is common to the three secondary windings and is connected to a source of alternating current. Connected across the bridge circuits at points between the connections to the secondary windings are potentiometers 54, 55 having adjustable contacts 56, 57. The contact 56 is shown connected to one end of the potentiometer resistance 55 while the contact 57 is connected to one end of the potentiometer resistance 11. One end of the potentiometer 54 and the contact 10 are connected to the amplifier 20 by conductors 59 and 60, respectively. Unbalances of the bridge circuits 45, 46 result in voltage drops across the potentiometers 54, 55, and the output voltages of the bridges are dependent upon the unbalance as well as the positions of the contacts 56, 57. These contacts are adjusted manually to predetermined positions and then left in such positions. The voltage outputs of the bridges represented by E and $E_1$ vary directly in proportion to the changes in the condition, as shown by the equations:

$$E_1 = K_1 X_1$$
$$E = KX$$

where K and $K_1$ are constants.

With the bridges connected into the system as shown, the voltage outputs add to oppose the voltage $E_2$ across an adjustable portion of the potentiometer 11. Any voltage difference between the voltage $E_2$ and the sum of E and $E_1$ causes the motor 21 to operate and position the contact 10 through the connection 22 until $E_2$ equals the total of E and $E_1$. The position of the contact 10 is then representative of the total of the conditions X and $X_1$ since $E_2$ when the system is balanced is equal to $K_2(X+X_1)$ where $K_2$ is a constant. By reversing the connections from the contact 56 and the end of the potentiometer 54, $E_2$ will be representative of the difference between X and $X_1$.

Fig. 4 shows a system in which two bridge circuits 64, 65 have their output voltages opposed to each other in determining the operation of the motor 21. Each of the bridges has one leg varying in resistance in response to changes in a variable, the resistances or variables being indicated by X and $X_1$. The input to bridge 64 is determined by the positioning of a contact 66 on a potentiometer 67 by a device, such as a Bourdon tube 68, responsive to some variable condition, such as temperature or pressure. The input to bridge 65 is varied in a similar manner by a Bourdon tube 69 operating in response to a variable for positioning a contact 70 along a potentiometer 71. The potentiometers 67 and 71 are energized by secondary windings 72, 73 of a transformer having its primary winding 74 connected to a source of power. The voltage outputs of the bridges 64, 65 are applied to potentiometers 75, 76 which are connected at one end by a conductor 77 and have their adjustable contacts 78, 79 connected to the amplifier 20 controlling the operation of the motor 21. Operative connections 22 between the motor and the contact 78 determine the position of the latter.

The voltages applied to the bridges 64, 65 are representative of the positions of contacts 66, 70 which in turn are representative of the variables acting on the devices 68, 69. These variables may be designated by the letters S and $S_1$, respectively. The voltage output of the bridge 64 is then equal to KSX while the output of bridge 65 is $K_1 S_1 X_1$. The voltage drop in the portion of the potentiometer 76 between the contact 79 and the conductor 77 opposes the voltage drop in the portion of the potentiometer 75 between the contact 78 and the conductor 77. The difference between these voltages causes the motor to operate and position the contact 78 until the voltages are equal. The position of the contact 78 is representative of a measured value which may be indicated by the letter Y, and the contact 79 may be positioned manually to obtain from the potentiometer 76 a fixed or a variable voltage which may be indicated by the letter $Y_1$. When the voltage input to the amplifier is zero, the following equations apply:

$$KSXY = K_1 S_1 X_1 Y_1$$

$$Y = \frac{K_1}{K}\left(\frac{S_1 X_1 Y_1}{SX}\right)$$

Assuming $K_1 = K$ then
$$Y = \frac{S_1 X_1 Y_1}{SX}$$

Fig. 5 shows a system similar to that of Fig. 4 with the unbalance of the bridge 64 determined by a resistance 82 which is varied by a device, such as a Bourdon tube 83, operating in response to changes in a condition, such as pressure in a conduit 84, and the unbalance of the bridge 65 determined by a resistance 85 varying in response to temperature at some point in the conduit. The input to the bridge 64 is determined by the positioning of a core member 86 relative to bucking secondary windings 87, 88 of a transformer in response to differentials in pressure at opposite sides of an orifice 89 arranged in the conduit. The voltage output of the bridge 64 is opposed to that of bridge 65 to determine the voltage applied to the amplifier 20, and the motor 21 positions the core member 90 relative to bucking secondary windings 91, 92 to determine the voltage input to bridge 65. The output voltage of each bridge is proportional to its input voltage times its unbalance. The input voltage to bridge 64 is proportional to the pressure differentials across the orifice 89 and may be represented by the letter H. The input voltage to bridge 65 is representative of the positions of the core member 90, and this value may be represented by the letter Z. The unbalances of bridges 64, 65 are proportional to the pressure P and the temperature T, respectively, in the conduit 84. The output voltages of the bridges 64, 65 may then be represented by the equations $$E_1 = K_1 HP$$
$$E_2 = K_2 ZT$$

When the output voltages are equal and the system is balanced, then $$K_1 HP = K_2 ZT$$

Assuming $K_1 = K_2$ then
$$Z = \frac{HP}{T}$$

and is shown by the indicator 23.

Bridge circuits are frequently provided with resistances forming different legs and varying in value with respect to each other on changes in a condition to be measured. In Fig. 6 I have shown a bridge 95 including resistance elements X in two of its legs and resistance elements $X_1$ in the other two legs. The elements X are adapted to change in resistance equal amounts in one direction while the elements $X_1$ change equal amounts in the opposite direction with changes in a condition to be measured. A bridge similar to this is used in some of the gages available for measuring strain. This bridge does not include means which is adjustable for varying the point from which the measurements of the condition may be obtained. In order that the point from which measurements are made may be adjusted and that measurements of the values from such point may be obtained, there are provided conductors 96, 97 from the output terminals of the bridge to movable contacts 98, 99 of potentiometers 100, 101 connected at their ends and energized from the secondary winding 103 of a transformer 104. An amplifier and motor control device 20 is connected in circuit with the conductor 96 and controls the operation of the motor 21 which positions the contact 98 through connections 22. The contact 99 is adapted to be positioned manually. A secondary winding 105 of the transformer 104 is connected to the bridge 95 for energizing the latter.

It will be seen that the potentiometers 100, 101 with their adjustable contacts 98, 99 form a bridge circuit, and the output voltage of this circuit opposes the output voltage of the bridge 95 to determine the flow of current through the amplifier and motor control device 20. An unbalance of the output voltages results in an operation of the motor 21 to position the contact 98 until the opposing voltages are equal. An adjustment of the contact 89 results in a change in the positions of contact 98 to produce a balance for predetermined conditions to be measured. The positions of contact 98 are representative of the conditions measured, and a changing of these positions by adjustment of contact 99 merely results in an indication of the values from a different zero point. It will be noted that this arrangement makes it possible to read the values as they change in either direction from the zero point since the voltage output of the two bridge circuits are always in opposition to each other.

As a result of my invention there are provided improved systems for measuring a variable or some function of a plurality of variables. In each system there is provided one or more balanceable networks which are unbalanced on variations of a condition and produce a voltage to be measured. The measurement of the voltage is accomplished in each case by regulating an opposing voltage until it is equal to the voltage to be measured. Although some of the systems have been shown and described as indicating functions of certain variables, it will be understood that they may be applied as well to the indication of functions of other variables.

While there are shown in this application several forms which my invention may assume in practice, it will be understood that these forms of the same are shown for purposes of illustration and my invention may be modified and embodied in various other forms without departing from its spirit or scope of the appended claims.

This application forms a division of my copending parent application S. N. 765,760 filed in the United States August 2, 1947, now Patent No. 2,612,628, issued September 30, 1952.

What I claim as new, and desire to secure by Letters Patent of the United States, is:

1. A measuring system comprising, in combination, a plurality of balanceable networks each adapted to be unbalanced in response to changes in a condition, means for energizing said networks from a common source of alternating current, output connections for said networks across which voltages are produced in proportion to their unbalance, means including a potentiometer energized from said source of alternating current, means for subjecting the output voltages of said networks in opposition to variable portions of the voltage drop across said potentiometer, and means operable in response to the difference between said opposed voltages for varying the portion of the voltage drop taken from said potentiometer.

2. A measuring system comprising, in combination, a pair of bridge circuits each having an element forming one of its legs and varying in resistance in response to changes in a condition, means for energizing said bridge circuits from a common source of alternating current, means for connecting the output voltages of said bridge circuits in opposition to each other, and means responsive to the differences between said output voltages for varying the voltage at which one of said bridge circuits is energized.

3. A measuring system comprising, in combination, a pair of bridge circuits each having an element forming one of its legs and varying in resistance in response to changes in a condition, means including a pair of transformers for energizing said bridge circuits from a common source of alternating current, means for connecting the output voltages of said bridge circuits in opposition to each other, a core member movable relative to the windings of one of said transformers for varying the voltage at which one of said bridge circuits is energized, and means responsive to the difference between said bridge output voltages for moving said core member.

4. A measuring system comprising, in combination, a bridge circuit adapted to be unbalanced in response to changes in a variable condition, a second bridge circuit having a pair of movable contacts for varying its unbalance, one of said contacts being arranged for manual movement, means including a transformer for energizing said bridge circuits from a common source of alternating current, means for connecting the output voltages of said bridge circuits in opposition to each other, and means responsive to the difference between said output voltages for moving the other of said movable contacts.

5. A measuring system including, in combination, a Wheatstone bridge having an element forming one of its legs and varying in resistance in response to changes in a first condition; means for energizing the bridge at diagonally opposite points by an alternating current potential; output connections for the bridge at points between the diagonal points of energization and including in series with the points a voltage magnitude and phase sensitive device, a Wheatstone bridge sensitive to a second condition, and a source of adjustable alternating current potential; and means controlled by the sensitive device for adjusting the source of alternating current potential until a balance is reached between the output of the bridge and the adjusted A.-C. potential.

6. A measuring system including in combination, a pair of bridge circuits each having an element forming one of its legs and varying in resistance in response to changes in a condition, means including a pair of movable core transformers for variably energizing said bridge circuits, core means of first said movable core transformer positioned in accordance with a condition, means for connecting the output voltages of said bridge circuits in opposition to each other, and means responsive to the difference between said output voltages for moving the core member of said second movable core transformer.

7. A fluid flow compensating system including in combination, a first bridge circuit having an element forming one of its legs varying in resistance in accordance with changes in pressure, a second bridge circuit having an element forming one of its legs varying in resistance in accordance with changes in temperature, means including a pair of movable core transformers for variably energizing said bridge circuits, core means of the first of said pair of movable core transformers positioned in accordance with rate of flow, means for connecting the output voltages of said bridge circuits in opposition to each other, and means responsive to the difference between said bridge output voltages for moving the core of said second movable core transformer, whereby the value of the flow is indicated as having been compensated for temperature and pressure.

References Cited in the file of this patent

UNITED STATES PATENTS

| Number | Name | Date |
|---|---|---|
| 2,495,844 | Hornfeck | Jan. 31, 1950 |
| 2,501,583 | Schafer | Mar. 21, 1950 |
| 2,510,467 | Fuge | June 6, 1950 |
| 2,565,922 | Howard | Aug. 28, 1951 |
| 2,589,597 | Baak | Mar. 18, 1952 |